US009223865B2

(12) United States Patent
Zhou et al.

(10) Patent No.: US 9,223,865 B2
(45) Date of Patent: Dec. 29, 2015

(54) METHOD AND SYSTEM FOR PROPERTY-BASED INDEXING AND/OR QUERYING OF WEB SERVICES RESOURCES

(75) Inventors: Yu Chen Zhou, Beijing (CN); Li Yi, Beijing (CN); Mao Xinsheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1420 days.

(21) Appl. No.: 11/739,985

(22) Filed: Apr. 25, 2007

(65) Prior Publication Data

US 2007/0255711 A1    Nov. 1, 2007

(30) Foreign Application Priority Data

Apr. 28, 2006  (CN) .......................... 2006 1 0082531

(51) Int. Cl.
| | |
|---|---|
| G06F 15/173 | (2006.01) |
| G06F 17/30 | (2006.01) |
| H04L 12/24 | (2006.01) |
| H04L 29/08 | (2006.01) |

(52) U.S. Cl.
CPC .... *G06F 17/30864* (2013.01); *G06F 17/30286* (2013.01); *H04L 41/0286* (2013.01); *H04L 67/16* (2013.01)

(58) Field of Classification Search
CPC .............. G06F 17/30286; H04L 67/16; H04L 41/0286
USPC ......................................... 709/217–219, 223
See application file for complete search history.

(56) References Cited

U.S. PATENT DOCUMENTS

| | | | |
|---|---|---|---|
| 5,857,072 A * | 1/1999 | Crowle ......................... 709/226 |
| 6,292,905 B1 * | 9/2001 | Wallach et al. ............... 709/239 |
| 6,609,123 B1 | 8/2003 | Cazemier et al. | |
| 6,944,619 B2 | 9/2005 | Gruenwald | |
| 2002/0099700 A1 | 7/2002 | Li | |
| 2002/0123999 A1 | 9/2002 | Bankert et al. | |
| 2002/0198875 A1 | 12/2002 | Masters | |
| 2003/0009470 A1 | 1/2003 | Leary | |
| 2005/0187897 A1 | 8/2005 | Pawar et al. | |
| 2005/0234843 A1 | 10/2005 | Beckius et al. | |
| 2006/0210051 A1 * | 9/2006 | Tomisawa ................ 379/265.02 |

FOREIGN PATENT DOCUMENTS

CN   200610082531.5   11/2007

OTHER PUBLICATIONS

Maguire, Tom, David Snelling, Tim Banks, "Web Services Service Group 1.2 (WS-ServiceGroup)", OASIS Standard, Apr. 1, 2006, Accessed via http://docs.oasis-open.org/wsrf/wsrf-ws_service_group-1.2-spec-os.pdf.*

(Continued)

*Primary Examiner* — Thomas Dailey
*Assistant Examiner* — Nam Tran
(74) *Attorney, Agent, or Firm* — Prentiss Johnson; Edell, Shapiro & Finnan, LLC

(57) ABSTRACT

In one aspect of the present disclosure, a method and system for creating and/or updating resource property-based indexes for Web Service Resources among multiple Web Services ServiceGroups is provided. In another aspect, a method and system for querying target WS-Resources with a certain property among multiple WS-ServiceGroups which have been connected with each other and have WS-Resource property indexes created therein is provided.

35 Claims, 5 Drawing Sheets

(56) References Cited

OTHER PUBLICATIONS

Vambenepe, William, Steve Graham, Sid Askary, Peter Niblett, "Web Services Topics 1.3 (WS-Topics)", OASIS Standard, Dec. 16, 2005, Accessed via http://docs.oasis-open.org/wsn/wsn-ws_topics-1.3-spec-pr-01.pdf.*

Sun Microsystems, "java.lang Class String", Accessed via http://web.archive.org/web/20030605035323/http://java.sun.com/j2se/1.4.2/docs/api/java/lang/String.html, Internet Archive Wayback Machine, Available online: Jun. 5, 2003, Accessed: Nov. 3, 2009, pp. 1-5, 26, and 33.*

"Multidimensional Index Structure with Multi-Level Entry and Skip-Level Search for Partially-Specified Queries." TDB v39 n11 11-96 p. 37-40.

* cited by examiner

METHOD AND SYSTEM FOR PROPERTY-BASED INDEXING AND/OR QUERYING OF WEB SERVICES RESOURCES

RELATED APPLICATION

This application claims the benefit of and priority to Chinese Application Number 200610082531.5, filed Apr. 28, 2006, the contents of which are incorporated by reference herein in its entirety.

BACKGROUND

1. Field

The present disclosure relates to the field of Web Service (WS) technology, and more particularly relates to a method and system for property-based indexing and querying of distributed WS resources (WS-Resources) in multiple loosely coupled WS-ServiceGroups.

2. General Background

The WS technology enables application programs to communicate with each other in a manner independent of platforms and programming languages. WS technology is the technical basis of Service Oriented Architecture (SOA). The SOA is a component model which connects different functional elements (also referred to as services) of application programs by defining interfaces and contracts between these services. An interface is typically defined in a neutral way, i.e., not being forced to bind to a specific implementation. Accordingly, a neutral interface is often referred to as a loose coupling of services.

A WS is a software interface that describes a set of operations in which access is passed in standardized Extensible Markup Language (XML) messages over a network. A WS uses XML language-based protocols to describe operations to be executed or data to be exchanged with another WS.

A WS-Resource Architecture has been proposed as a method to represent the relationship between stateful resources and WS's. Until recently, several standards have been defined to address complex problems related to querying and accessing Web Services.

In general, a WS-Resource Framework (WSRF) defines a set of mechanisms for WS-Resources, WS-ResourceProperties and WS-ServiceGroups.

The WSRF defines the standardized description of WS-Resource methods according to specific WS message exchanges and related XML definitions. The WS-Resource Framework allows WS-Resources to be declared, created, accessed, monitored for changes, and destroyed via conventional WS mechanisms, but does not require that WS components of WS-Resources that provide access to the associated stateful resources be implemented as a stateful resource processor.

A WS-Resource is a Web service through which a resource can be accessed. The WS-Resource is further defined as follows: (1) an identifier of the resource must appear as a part of any message directed to the WS-Resource, to allow the WS-Resource to build the semantic interpretation of the resource targeted by the message; (2) the set of properties of the resource must be expressed using an XML Infoset described by XML schemas.

A WS-Resource Property is information defined as a part of a state model of a WS-Resource, and may reflect state, metadata, manageability information and the like of the resource.

A WS ServiceGroup (hereinafter ServiceGroup) is a WS-Resource, which represents a collection of Web services or WS-Resources and the information that pertains to them. The purpose of the group is application domain specific.

The WS-Resource Framework is mainly defined by five standardized specifications, which are a shown in the following Table 1.

TABLE 1

| Name | Description |
| --- | --- |
| WS-ResourceLifetime | Mechanisms for WS-Resource destruction, including message exchanges that allow a requestor to destroy a WS-Resource, either immediately or by using a time-based scheduled resource termination mechanism. |
| WS-ResourceProperties | Definition of a WS-Resource, and mechanisms for retrieving, changing, and deleting WS-Resource properties. |
| WS-RenewableReferences | A conventional decoration of a WS-Addressing endpoint reference with policy information needed to retrieve an updated version of an endpoint reference when it becomes invalid. |
| WS-ServiceGroup | An interface to heterogeneous by-reference collections of Web services. |
| WS-BaseFaults | A base fault XML type for use when returning faults in a Web services message exchange. |

In addition, a family of WS-Notifications (WSN) specifications, which is used to define standard flows for creating an event-driving system in a Web services environment, has been proposed. The family of WS-Notification specifications defines a general, topic-based Web service system, which is used to publish/subscribe WSRF-based interactions. One basic method employed is to define mechanisms and interfaces to allow a client to subscribe interested topics, such as any change of resource property values of a WS-Resource. For example, the family of specifications related to the WS-Resource Framework and WS-Notification described above is available at www.oasis-open.org. In the WS-Resource Framework, only the resource description framework and client/server mode are defined for the client to get and set the properties of the WS-Resources. Therefore, when there is more than one ServiceGroup, the client queries all the instances of the ServiceGroups to get the properties of the WS-Resources. Currently, there is no better way to integrate multiple ServiceGroups so that the client can query properties of all the distributed target WS-Resources.

SUMMARY

In one aspect of the present disclosure, a method and system for creating and/or updating resource property-based indexes for WS-Resources among multiple WS-ServiceGroups is provided.

In another aspect, a method and system for querying target WS-Resources with a certain property among multiple WS-ServiceGroups which have been connected with each other and have WS-Resource property indexes created therein is provided.

In yet another aspect, a computer executable program for implementing the above method for resource property-based indexing and/or querying, a machine readable storage medium with codes of the computer executable program stored thereon, and a computer program product with codes of the computer executable program encoded thereon is disclosed.

According to a first aspect of the present disclosure, there is provided a method for creating WS-Resource property indexes among WS ServiceGroups which include at least a first WS-ServiceGroup and one or more second WS-ServiceGroups. The first WS-ServiceGroup has a WS-Resource which is defined by one or more properties. The first WS-ServiceGroup publishes at least one topic. The second WS-ServiceGroup which has subscribed to the at least one topic of the first WS-ServiceGroup, is notified of subtopics for said properties from the first WS-ServiceGroup. Index entities are created for said properties in the second WS-ServiceGroup. The second WS-ServiceGroup is also notified of values of said properties from the first WS-ServiceGroup. The index entities for said properties in said second WS-ServiceGroup(s) are processed according to the values of said properties.

According to a second aspect of the present disclosure, there is provided a system for creating WS-Resource property indexes among WS ServiceGroups. The system comprises a publishing module configured to publish, from the first WS-ServiceGroup, at least one topic relating to the properties of a WS-Resource. The system further comprises a first notification module configured to notify one or more second WS-ServiceGroups, which have subscribed to the at least one topic of the first WS-ServiceGroup, of subtopics for said properties from the first WS-ServiceGroup. An index creation module is configured to create index entities for said properties in said second WS-ServiceGroup. A second notification module is configured to notify said second WS-ServiceGroup of values of said properties from the first WS-ServiceGroup. The system also comprises a processing module which is configured to process the index entities for said properties in said second WS-ServiceGroup according to the values of said properties.

According to yet another aspect of the present disclosure, there is provided a method for performing a property-based query of WS-Resources among multiple connected WS ServiceGroups, which include at least a first ServiceGroup, and in which property index tables of WS-Resources in remote ServiceGroups connected therewith have been created and are updated in real time, said method comprising steps of: a) receiving, in the first ServiceGroup, a query request for a target WS-Resource with at least a certain resource property; b) checking a local index table for said property; c) if a remote ServiceGroup reference is found in the local index table, then forwarding said query request to said remote ServiceGroup; d) repeating the above steps b) and c) by said remote ServiceGroup until said query request is forwarded to a target ServiceGroup to which the target WS-Resource is registered; e) after the target ServiceGroup to which the target WS-Resource is registered receives said query request, the target ServiceGroup returning a response to ServiceGroups from which said query request is received, the response including an endpoint reference of the target WS-Resource and properties of the resource; and f) obtaining said response by the first ServiceGroup from the ServiceGroups which has received said response.

According to a fourth aspect of the present disclosure, there is provided a system for performing a property-based query of WS-Resources among multiple connected WS ServiceGroups, which include at least a first ServiceGroup, and in which property index tables of WS-Resources in remote ServiceGroups connected therewith have been created and are updated in real time, said system comprising: means for receiving, in the first ServiceGroup, a query request for a target WS-Resource with at least a certain resource property; means for checking a local index table for said property; means for forwarding said query request to said remote ServiceGroup if a remote ServiceGroup reference is found in the local index table; means for returning, by a target ServiceGroup to which the target WS-Resource is registered, a response to ServiceGroups from which said query request is received, after the target ServiceGroup receiving said query request, the response including an endpoint reference of the target WS-Resource and properties of the resource; and means for obtaining said response in the first ServiceGroup from the ServiceGroups which have received said response.

According to another aspect of the present disclosure, there is also provided a computer executable program for executing steps of the above methods, a machine readable storage medium with codes of the computer executable program stored thereon, and a computer program product with codes of the computer program encoded thereon.

The above and other features and advantages of the present disclosure will become more apparent from the following detailed description of preferred embodiments of the present disclosure taken in conjunction with the accompanying drawings.

DRAWINGS

The present disclosure will be better understood by referring to the following description taken in conjunction with the accompanying drawings, and the same or similar reference signs are used to denote the same or similar elements throughout the drawings. The drawings together with the following detailed description are incorporated into the specification and form as a part of the specification, and are used to further illustrate the preferred embodiments of the present disclosure and explain the principles and advantages of the present disclosure, in which.

Figure 1:
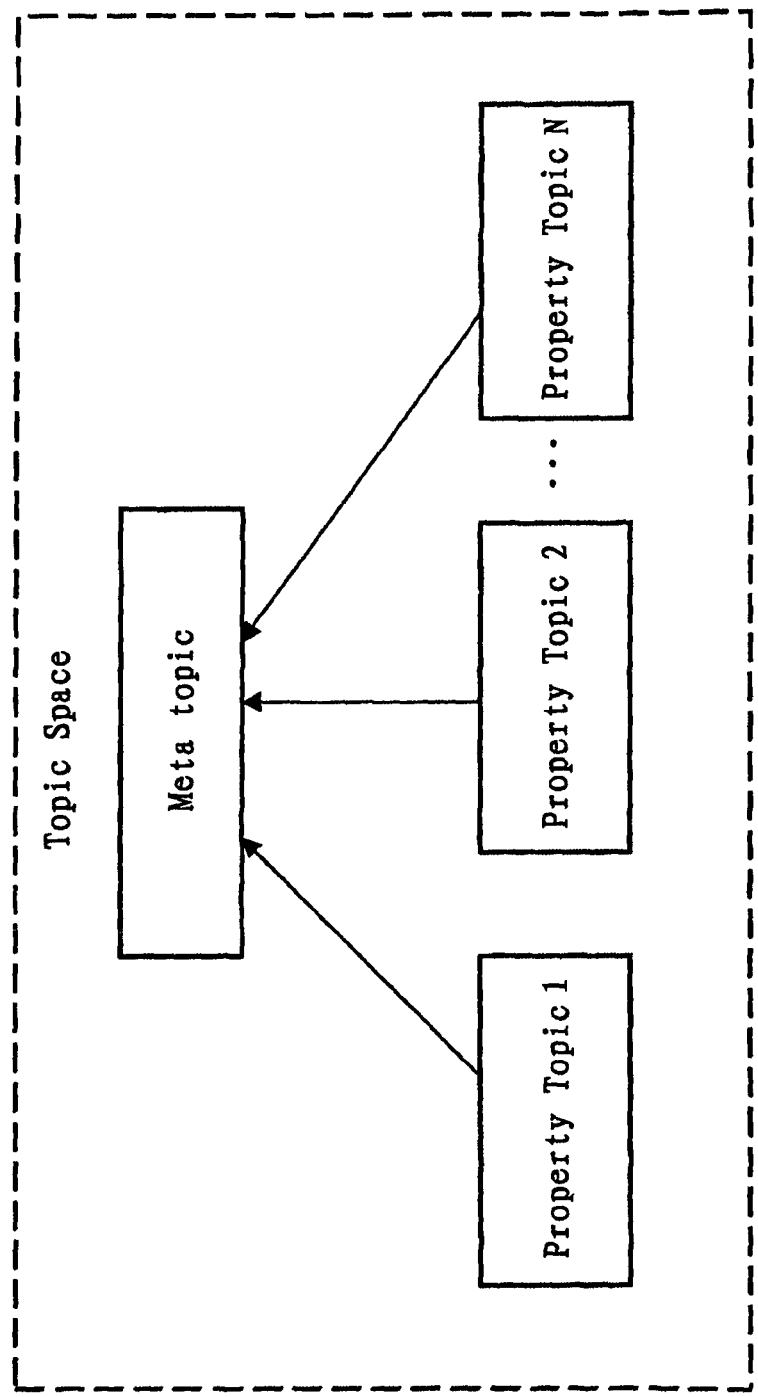
FIG. 1 shows an example of a topic space with a two-level topic structure, which is used for property-based indexing among multiple ServiceGroups.

Those skilled in the art will appreciate that elements in the figures are illustrated only for simplicity and clarity and have not necessarily been drawn to scale. For example, the dimensions of some of the elements in the figures may be exaggerated relative to other elements to help to improve understanding of the embodiments of the present disclosure.

DETAILED DESCRIPTION

Exemplary embodiments of the present disclosure will be described below. For the purpose of clarity, not all the features of actual implementations are described in the specification. However, it should be appreciated that during the development of any such actual embodiment, numerous implementation-specific decisions must be made to achieve the developer's specific goals, for example, compliance with system-related and business-related constraints which will vary from one implementation to another. Moreover, it should be appreciated that such a development effort might be complex and time-consuming, but may nevertheless be a routine undertaking for those skilled in the art having the benefit of this disclosure.

In order to make those skilled in the art to better understand the present disclosure without referring to other references, before describing in detail the specific embodiments of the present disclosure in conjunction with the accompanying drawings, the relevant techniques involved in the present disclosure will be briefly described at first.

A mechanism is provided to integrate distributed instances of WS ServiceGroups (hereinafter referred as ServiceGroups) so that the client can query the target WS-Resources through simple operations. In the present disclosure, multiple WS ServiceGroups are connected together, and information is exchanged among these connected multiple ServiceGroups via Web Service notifications. That is, when a ServiceGroup B wants to get property-based indexes of a WS-Resource in a ServiceGroup A, the ServiceGroup B is implemented as a NotificationConsumer so that it can subscribe, as a subscriber, to the ServiceGroup A for any change in the WS-Resource associated with the indexed properties, while the ServiceGroup A must be implemented as a NotificationProducer so as to publish a set of topics and values regarding the resource properties to be indexed.

The notifications may relate to anything including a change of values of the resource properties, other internal changes of the state of the NotificationProducer, or some other "situations" in the environment. The subscriber registers to receive notification messages about one or more topics by sending a "Subscription" message. In a response, the subscriber receives an endpoint reference defined by the subscribed" WS-Resources. The subscribing of the WS-Resource models the relationship between the subscriber and the producer, and then uses the WS-ResourceProperties and WSResourceLifetime to assist in managing this relationship.

A topic is a mechanism for organizing notification messages so that the subscriber can conveniently know which kinds of notifications are available for subscription. Topics can be organized in terms of levels; one topic can be further divided into sub-topics.

Connected ServiceGroups publish a set of topics defined by a unified TopicSpace. In one aspect, there is a topic structure that comprises at least two levels as defined in the TopicSpace.

For each external ServiceGroup which is provided with indexes by local ServiceGroups, a separate TopicSpace may be created, or a common TopicSpace may be shared. In one aspect, when sharing a common TopicSpace, only one root topic, called a meta topic, is defined for each external ServiceGroup, and the children of the root topic are topics for resource properties to be indexed. The meta topics may be the same or different from one ServiceGroup to another, depending on the implementations. While the meta topics are different, AliasRefs should be declared for all the topics for the same resource property in the different hierarchy according to the WS-Notification specifications.

The ServiceGroup selects the resource properties to be indexed, and creates an index table (i.e., property index table) for each property to be indexed. Further, the topic for a resource property is the topic of the WS-Notification for a specific resource property. The topic for the resource property is used for the ServiceGroup to notify other connected ServiceGroup instances to change the state of the indexed property. It also defines rules for tokenizing the value of the property. The value of the resource property is tokenized according to the above rules, and then compared and filled into the index table. The result may contain one or more tokens.

The following is an example using a specific rule <->:
Location: <Asia-China-Beijing>
(including tokens in three levels: Asia, China, Beijing)
EPR: <com.ibm.cn.csdl.wsgroup/sample>
(including a unique undivided token)
WSDL: http://example.com/foo.wsdl
(including a unique undivided token)

Hereinafter, the present disclosure will be illustrated in a distributed computing environment in which Web services and resources are included.

FIG. 1 shows an example of a topic space with a two-level topic structure, which is used for property-based indexing among multiple ServiceGroups. In the example as shown in FIG. 1, for the purpose of simplicity, the topic space is shown to have a two-level topic structure; however, the topic space may have a multi-level topic structure if necessary. Multiple ServiceGroups can be connected through WS-Notifications based on the same topic space.

Figure 2:
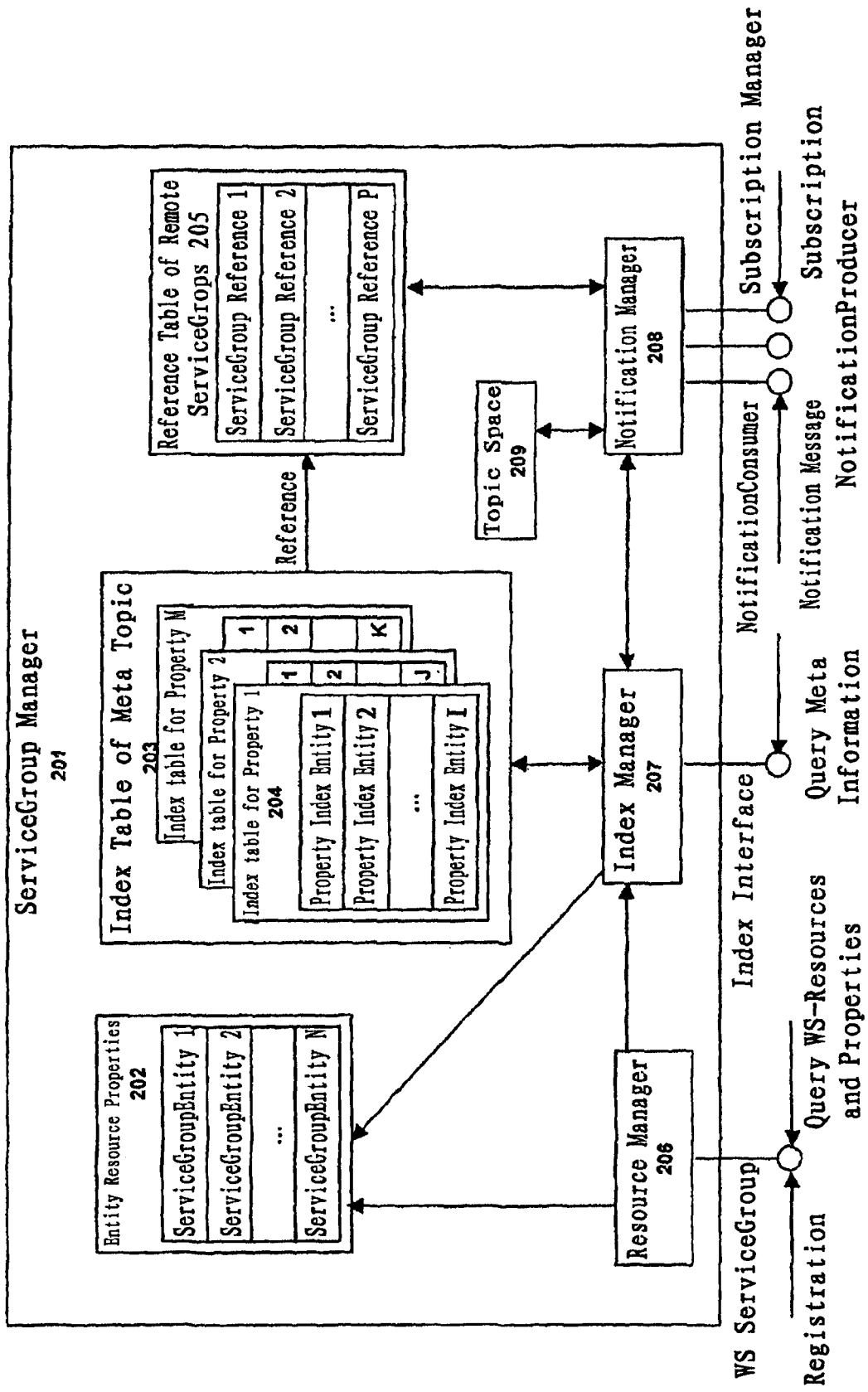
FIG. 2 shows a structure of a ServiceGroup manager for property indexes of distributed WS-Resources according to an embodiment of the present disclosure.

FIG. 2 shows a structure of a ServiceGroup manager 201 for properties indexes of distributed WS-Resources according to an embodiment of the present disclosure.

As shown in FIG. 2, the ServiceGroup manager 201 mainly comprises an entity resource property table 202, an index table of meta topic 203, a reference table of remote ServiceGroups 205, a resource manager 206, an index manager 207, a notification manager 208, a topic space 209 and the like.

For the purpose of simplicity and clarity, FIG. 2 only shows several constituting components in the ServiceGroup manager, which are related to the present disclosure. However, the ServiceGroup manager 201 may obviously comprise other components, if necessary or based on the practical requirements.

The entity resource property table 202 is a table of the WS-Resources directly registered to the WS ServiceGroup manager 201. The entity resource property table 202 includes ServiceGroupEntities defined by the WS ServiceGroup specifications for all the registered WS-Resources. As shown in FIG. 2, the entity resource property table 202 includes a ServiceGroupEntity 1, a ServiceGroupEntity 2, . . . a ServiceGroupEntity N, wherein N is an integer larger than zero.

The index table of meta topic 203 is a two-dimensional index table associated with the meta topic, in which property names constitute a table of the first level while index entities constitute a table of the second level. The index table of meta topic 203 contains a property index table 204-1 for property 1, a property index table 204-2 for property 2, . . . , a property index table 204-M for property M, wherein M is an integer larger than zero.

Hereinafter, for the purpose of simplicity, these property index tables 204-1, 204-2, . . . , 204-M are collectively referred to as property index tables 204. The property index tables 204 are comprised of pairs of values and source lists, and are index tables for specific property topics. As described above, one index table is created for each property to be indexed.

Each property index table 204 can contain multiple property index entities. For example, as shown in FIG. 2, the property index table 204-1 contains a property index entity 1, . . . , a property index entity 1, the property index table 204-2 contains a property index entity 1, . . . , a property index entity J, . . . , and the property index table 204-M contains a property index entity 1, . . . , a property index entity K, wherein I, J, . . . , K are all integers larger than zero.

Each property index entity indicates a range of the value of the corresponding resource property, and paths to register this value. In one embodiment of the present disclosure, a property index contains the following fields:

Start Value: the start value of the range of the property from which a single value within this range is registered from instances of a ServiceGroup in a source list.

End Value: the end value of the range of the property for this index entity.

Source List: a list of endpoint references to all the connected instances of the ServiceGroup and additional information. All the instances in this list are sources of the property value within the range of this index entity.

Additional Information: other information besides the above mentioned information.

The property index entity may contain parts of the above fields, or other fields, if necessary or based on the requirements. In order to avoid randomly increased indexes, the properties to be exposed as indexes may belong to a common property profile. Additional index properties should be added according to the management and agreements among the community of the ServiceGroups.

The reference table of remote ServiceGroups 205 is a table containing ServiceGroup references and additional metadata of all the directly connected ServiceGroups. According to the definitions in the WS-ResourceProperties specifications, a ServiceGroup reference is the endpoint reference defined in the WS-Addressing specifications. The reference table of remote ServiceGroups 205 can contain multiple ServiceGroup references, for example, a ServiceGroup reference 1, a ServiceGroup reference 2, . . . , a ServiceGroup reference P, wherein P is an integer lager than zero.

The resource manager 206 is a component that handles requests of ServiceGroupMember registration and querying of resource properties. It implements a ServiceGroup interface defined by the WS-ServiceGroup specifications. It manages the ServiceGroup members registered thereto, and also queries remote resource properties based on the index manager 207.

The index manager 207 is a component that handles local index tables and indexing operations, which provides the following functions:

providing index information for the resource manager 206 to query remote resource properties;

retrieving index information for local ServiceGroup members;

updating index information for remote resource properties triggered by the notification manager 208; and providing index information for users to retrieve the meta information of indexes.

The notification manager 208 is a component which manages connections among the connected ServiceGroups, which provides the following functions:

implementing a NotificationProducer interface, and publishing topics described in the topic space 209;

implementing a NotificationConsumer interface to receive notification messages from other ServiceGroups and call the index manager to change contents of the index tables;

managing the topic space according to changes in the resource properties to be indexed; and implementing a SubscriptionManager interface to allow other ServiceGroups to subscribe topics defined in the topic space.

The topic space 209 is a data structure describing, for example, the topic space shown in FIG. 1 which contains topics published by the local ServiceGroups.

Although the term of "an entity resource property table" is used in the present disclosure, those skilled in the art should appreciate that, according to the relevant Web Service specifications, when an operation of querying the WS-Resources and properties is being executed among the ServiceGroups, it is required to get the ServiceGroup entities 1, 2, . . . , N through the resource manager 206, so that an entity resource property table containing the above ServiceGroup entities can be generated dynamically. However, it is not necessary that this table physically exists in the ServiceGroup manager 201, that is, the above ServiceGroup entities may be stored separately from the ServiceGroup manager 201.

Although the term "topic space" is used in this specification, those skilled in the art should understand that the topic space 209 may be a database structure that contains multiple topic space structures depending on the specific implementations.

A process of how to create connections and indexes among ServiceGroups according to an embodiment of the present disclosure will be described.

Figure 3:
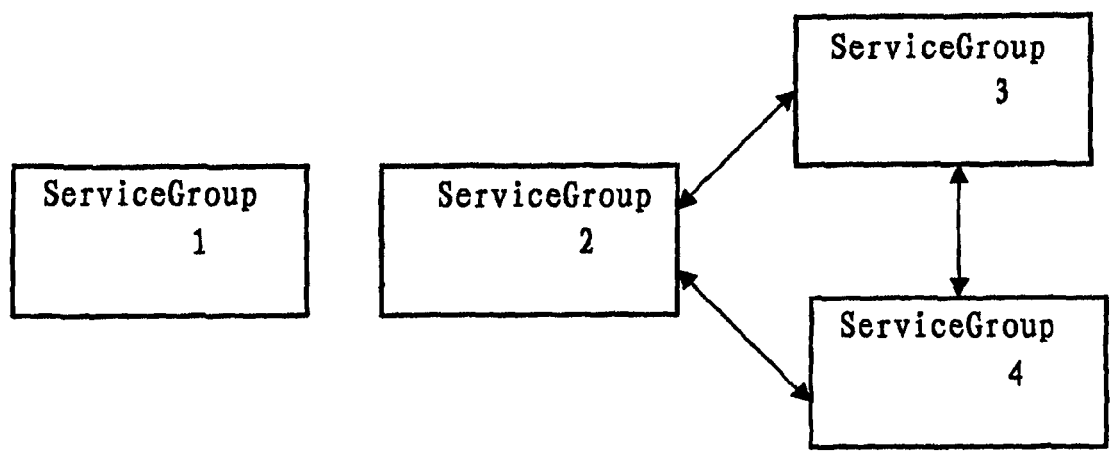
FIG. 3 shows an exemplary environment in which the indexing method according to the present disclosure is to be applied.

In order to better explain the process of how to interact among multiple ServiceGroups, for example, four ServiceGroups 1, 2, 3, and 4 will be described below, and it is assumed that these ServiceGroups are in an exemplary environment as shown in FIG. 3 in their initial states.

FIG. 3 shows an exemplary environment in which the indexing method according to the present disclosure is to be applied. As shown in FIG. 3, in this environment, connections have been established among the ServiceGroups 2, 3, and 4 (for the purpose of simplicity, these connections are schematically shown as connection lines in this figure), and the indexing directions among them are denoted by the arrow directions as shown in the figure.

As shown in FIG. 3, full connections (i.e., bidirectional connections) have been established among ServiceGroups 2, 3, and 4: that is, bidirectional indexing has been performed between ServiceGroups 2 and 3, between ServiceGroups 2 and 4, and between ServiceGroups 3 and 4, respectively.

Each of the above ServiceGroups 1-4 includes a ServiceGroup manager as described above in connection with FIG. 2.

According to the present disclosure, if ServiceGroup 1 requests to be connected to ServiceGroup 2, then connections will be established between ServiceGroup 1 and other ServiceGroups 2, 3, and 4, and property-based index tables of the distributed WS-Resources are created in ServiceGroups 1-4 according to the practical situations and agreements. This process is shown in FIG. 4.

Figure 4:
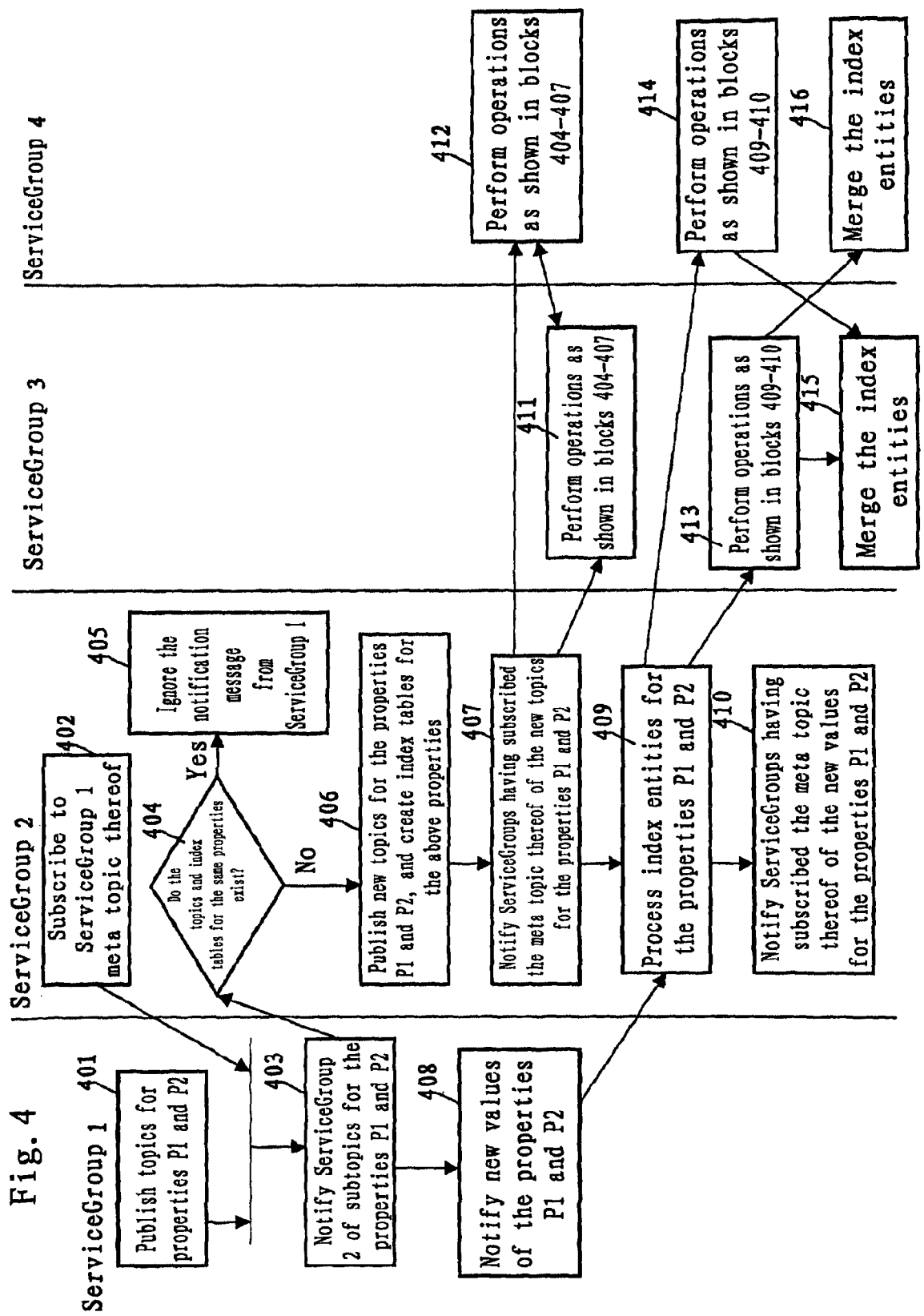
FIG. 4 shows a process of creating property index tables of WS-Resources among four ServiceGroups as shown in FIG. 3 according to an embodiment of the present disclosure.

FIG. 4 shows a process for creating connections and properties index tables of resources among the four ServiceGroups 1-4 as shown in FIG. 3 according to one aspect of the present disclosure.

For the purpose of simplicity and clarity, only the processing steps related to the process of the present disclosure are shown in FIG. 4.

As shown in block 401, when ServiceGroup 1 wants to be connected to ServiceGroup 2, it determines properties to be exposed as indexes, for example, properties P1 and P2 according to the relevant strategies, and adds and publishes new topics related to these properties, i.e., P1 and P2 as the child nodes of it's meta topic, that is, modifies the structure of the topic space of ServiceGroup 1. At the same time, ServiceGroup 1 would create one property index table for each of the properties P1 and P2, respectively.

Herein, the properties P1 and P2 can be any property suitable to be indexed, for example, location of the ServiceGroup, etc., depending on the practical requirements. In the present embodiment, it is assumed that P1=location, P2=NoSinglePointOfFailure. Of course, there may be other properties. Moreover, two or more properties, or even only one property may be used if necessary.

If ServiceGroup 2 finds that there exists a ServiceGroup, i.e., ServiceGroup 1, which wants to be connected thereto, then a connection is established between the two ServiceGroups. This finding procedure can be an automatic finding procedure, for example, an automatic broadcast-based finding procedure. However, other methods may also be employed.

For the sake of simplicity of the description in the present embodiment, it is assumed that a monodirectional connection is established between ServiceGroups 1 and 2, and property indexes of the WS-Resources in ServiceGroup 1 are created in ServiceGroup 2.

After the connection between ServiceGroups 1 and 2 has been established, as shown in block 402, ServiceGroup 2, which wants to get indexes from ServiceGroup 1, subscribes to the meta topic of ServiceGroup 1. That is, ServiceGroup 2 acts as a NotificationConsumer, while ServiceGroup 1 acts as a NotificationProducer, and ServiceGroup 1 notifies ServiceGroup 2 of the creation of the above property index tables.

After ServiceGroup 2 subscribes to the meta topic of ServiceGroup 1 as a subscriber, as shown in block 403, ServiceGroup 1 notifies all the ServiceGroups which have subscribed to its meta topic (in the present example, ServiceGroup 2) of sub-topics related to the properties published by it, i.e., sub-topics related to the properties P1 and P2.

After ServiceGroup 2 has received notification from ServiceGroup 1, as shown in block 404, it is determined whether topics and index tables for the same properties P1 and P2 have been created (or have existed) in ServiceGroup 2 or not.

If it is determined in block 404 that topics and index tables for the same properties have been created (or already exist), then as shown in block 405, ServiceGroup 2 ignores the above notification message from ServiceGroup 1.

Otherwise, if it is determined in block 404 that the topics and index tables for the same properties P1 and P2 do not exist in ServiceGroup 2, then as shown in block 406, ServiceGroup 2 publishes new topics related to properties P1 and P2, and creates index tables for these properties. As described above in connection with FIG. 2, these index tables contain index entities for the properties P1 and P2.

The following Table 2 is an example of the property index tables used for the property P1=location in an embodiment of the present disclosure.

TABLE 2

| Asia-China-Beijing | SG1 |
| Asia-China-Shanghai | SG3, SG4 |
| Europe-England-Hursly | SG3, SG4 |

Because ServiceGroup 2 is also bidirectionally connected with ServiceGroups 3 and 4 in the exemplary environment as shown in FIG. 3, after executing the operation as shown in block 406, as shown in block 407, ServiceGroup 2 will notify all the NotificationConsumers, which are directly connected with ServiceGroup 2 and have subscribed the meta topic thereof, that is, ServiceGroups 3 and 4 in the present embodiment, of the new topics for the properties P1 and P2.

After executing the operation as shown in block 403, as shown in block 408, ServiceGroup 1 will also notify all the ServiceGroups that have subscribed to the meta topic thereof (in this example, ServiceGroup 2) of new values of the properties P1 and P2 for indexing. These values come from all the ServiceGroup members that have subscribed to ServiceGroup 1.

Depending on the different implementations, etc., the operation as shown in block 408 and the operations as shown in blocks 404 and 405 may or may not be performed simultaneously.

As shown in block 409, after receiving the notification message about the new values of the properties P1 and P2 from ServiceGroup 1, ServiceGroup 2 performs a suitable process on the index entities for the properties P1 and P2 according to said values, that is, creates, merges or splits one or more index entities about the values of the properties P1 and P2 according to the determination as to whether said values are within the range of any of existing entities. Specifically, if said values are not within the range of any existing entity, ServiceGroup 2 creates new index entities for said values; if said values equal to the old values as keys of the index entities, then ServiceGroup 2 will merge said values with the existing entities by adding the reference of ServiceGroup 1 into its source list; and if said values are within the ranges of the values of some index entities, then ServiceGroup 2 will split these index entities into more than one entities with different value ranges and source lists.

For example, if an initial index entity is as follows: (a service classification value based on a certain standard) 200-205→(index address) source1.foo.com, and the new index entity is as follows: 203→source2.foo.com, then the following three index entities will be generated by splitting:

200-202→source1.foo.com
203-203→source1.foo.com; source2.com
204-205→source1.foo.com.

Next, as shown in block 410, ServiceGroup 2 will notify all the ServiceGroups, which are directly connected thereto and have subscribed to the meta topic thereof, of the new values of the properties P1 and P2, that is, ServiceGroup 2 will notify ServiceGroups 3 and 4 of the new values of the properties P1 and P2.

The process of how to create connections and index tables only between ServiceGroups 1 and 2 has been described above. However, as assumed in the above, the bidirectional connections have been established among ServiceGroups 2, 3, and 4. That is, ServiceGroups 3 and 4 are NotificationConsumers with respect to ServiceGroup 2, and they can be a NotificationProducer or NotificationConsumer with respect to each other. Therefore, as shown in blocks 411-414 in FIG. 4, ServiceGroups 3 and 4 also execute the processing operations similar to those of ServiceGroup 2.

Specifically, when receiving the new topics about the properties P1 and P2 from ServiceGroup 2, as shown in blocks 411 and 412, ServiceGroups 3 and 4 execute processing operations similar to the operations as shown in blocks 404-407. That is, ServiceGroups 3 and 4 determine whether the topics and index tables related to properties P1 and P2 exist or not, and when it is determined that the topics and index tables for the same properties do not exist, publish new topics for properties P1 and P2, create index tables for the above properties, and notify all the NotificationConsumers, which are directly connected thereto and have subscribed to the meta topic thereof, of the new topics for properties P1 and P2. ServiceGroups 3 and 4 will notify each other of the new topics for properties P1 and P2.

Moreover, after receiving the new values of properties P1 and P2 from ServiceGroup 2, as shown in blocks 413 and 414, ServiceGroups 3 and 4 perform processing operations similar to the operations as shown in blocks 409 and 410. That is, ServiceGroups 3 and 4 create, merge or split one or more index entities about the values of properties P1 and P2 according to said values, and notify all the ServiceGroups, which are directly connected thereto and have subscribed to the meta topic thereof, of the new values of properties P1 and P2. ServiceGroups 3 and 4 will notify each other of the new values of properties P1 and P2.

ServiceGroups 3 and 4 differ from ServiceGroup 2 in that ServiceGroups 3 and 4 would receive the notification message about the new values of properties P1 and P2 from each other, that is, ServiceGroups 3 and 4 would receive the new topics and new values for the properties P1 and P2 from different paths. Thus, as shown in blocks 415 and 416, it is required to merge the index entities about the properties P1 and P2 in ServiceGroups 3 and 4.

The process of creating WS-Resource property index tables, which is executed when ServiceGroup 1 is connected to ServiceGroup 2 in the exemplary environment as shown in FIG. 3, has been described above in connection with FIG. 4.

After the above creating process, the index tables about the WS-Resources in ServiceGroup 1 are created in ServiceGroups 2, 3 and 4.

Subsequently, when any WS-Resource property in ServiceGroup 1 is changed, the connected ServiceGroups 2-4 must be notified of the change. That is, the above mentioned index tables are updated. The updating process is similar to the creating process discussed above, therefore, for the purpose of simplicity, the updating process will not be further described to avoid unnecessary repetitions.

The process of creating and/or updating the property index tables in the exemplary environment as shown in FIG. 3 (where a monodirectional connection is established between ServiceGroups 1 and 2 and bidirectional connections are established among ServiceGroups 2, 3, and 4) has been described above. However, in fact, it is obvious that other numbers of ServiceGroups may be possible and other connection relationships may exist among the ServiceGroups 1, 2, 3, and 4. Depending on the different number of the ServiceGroups and the different connection relationships among the ServiceGroups, the process of creating (and/or updating) the WS-Resource property index tables as shown in FIG. 4 may also be different.

For example, in the case where only a monodirectional connection is established between ServiceGroups 3 and 4 while other conditions are unchanged, when it is supposed to create, in ServiceGroup 4, the property index tables of the distributed WS-Resources in ServiceGroup 3, ServiceGroup 3 will notify ServiceGroup 4 of the new topics and new values for properties P1 and P2, rather than mutual notification between ServiceGroups 3 and 4 as described above, and it is unnecessary for ServiceGroups 3 and 4 to execute the processing operations as shown in blocks 415 and 416.

In addition, in the exemplary environment described above, if a bidirectional connection can be established between ServiceGroups 1 and 2, then besides the processing operations discussed above in connection with FIG. 4, ServiceGroups 1 and 2 can also be a NotificationConsumer or NotificationProducer with respect to each other. That is, in ServiceGroup 1, the property index tables about the WS-Resources in ServiceGroup 2 will also be created, and the property index tables about the WS-Resources in ServiceGroups 3 and 4 will be created via ServiceGroup 2 also.

Figure 5:
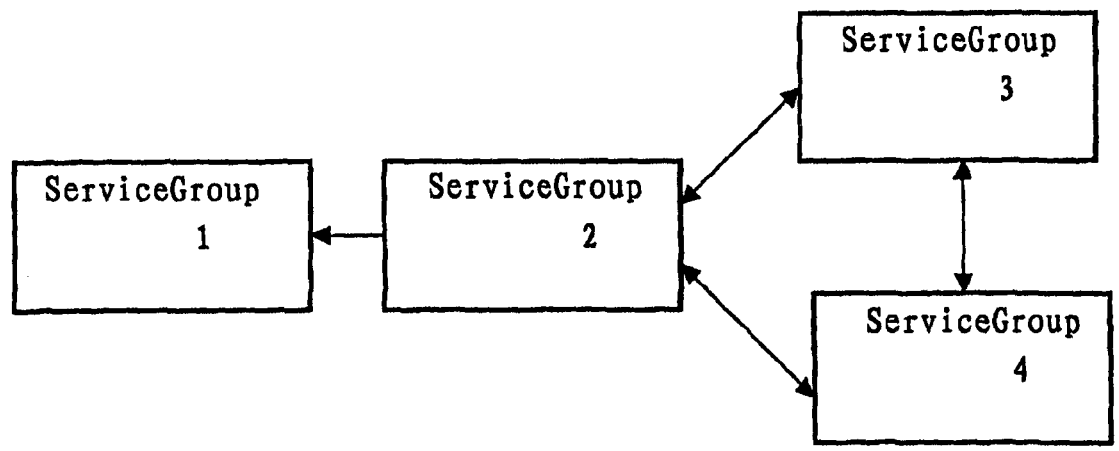
FIG. 5 shows the exemplary environment after executing the process as shown in FIG. 4 in the exemplary environment as shown in FIG. 3.

FIG. 5 shows the exemplary environment after creating/updating the WS-Resource property index tables among the four ServiceGroups 1-4 as shown in FIG. 3 described above in connection with FIG. 4.

Next, how to perform a property-based query of WS-Resources in the exemplary environment as shown in FIG. 5 will be described in connection with the flowchart in FIG. 6.

Figure 6:
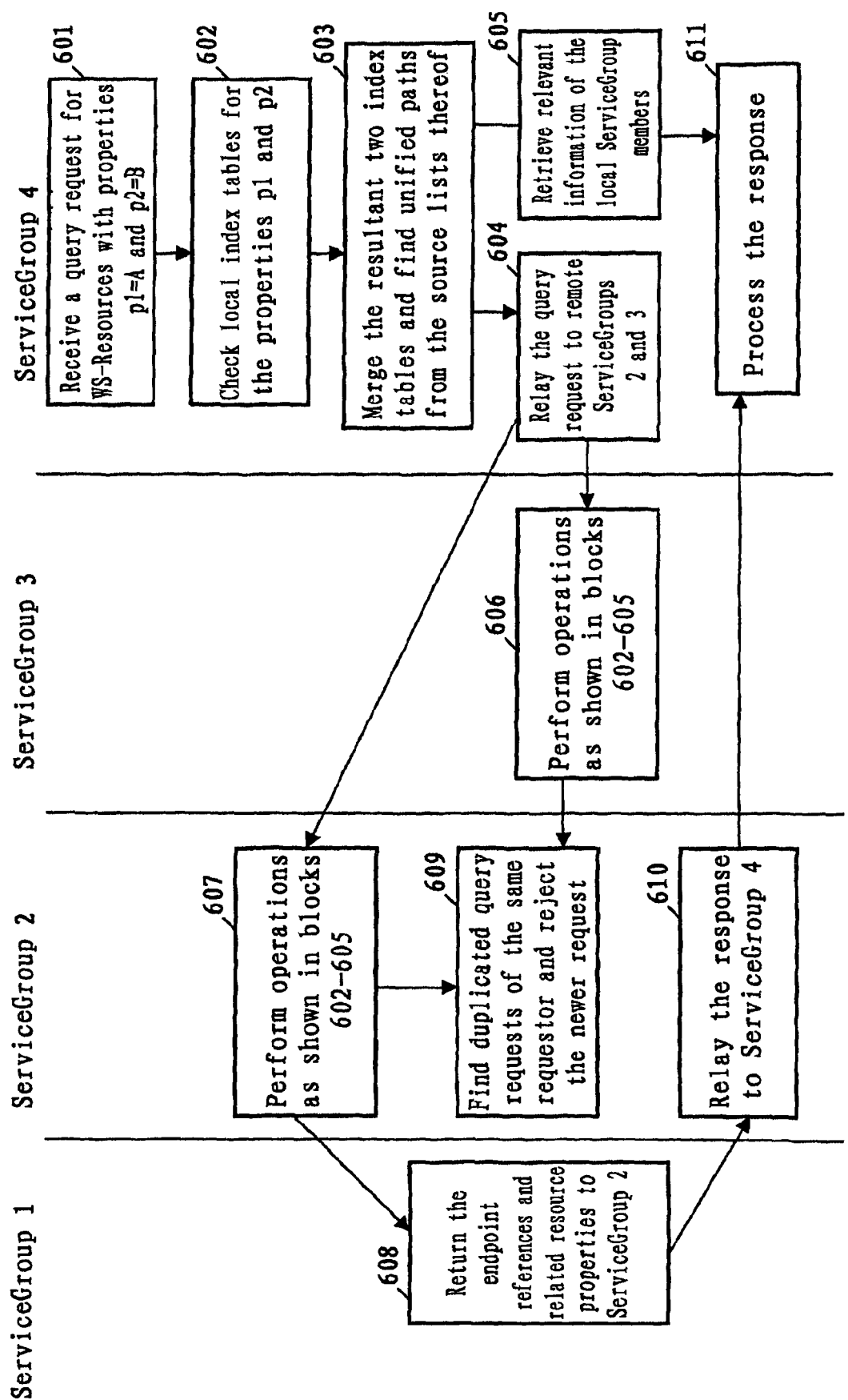
FIG. 6 shows a process of querying target WS-Resources with at least a certain property among the four ServiceGroups as shown in FIG. 5 according to an embodiment of the present disclosure.

FIG. 6 shows a process of performing a property-based query of distributed WS-Resources among the four ServiceGroups as shown in FIG. 5 according to one embodiment of the present disclosure.

Such a querying process is used to find all the distributed WS-Resources, of which their properties can meet the need of a requestor, residing on the different ServiceGroups. For example, a complex query could be supported by using XQuery and Xpath. The results of such querying process are a set of references to the WS-Resources and the corresponding resource properties.

For ease of illustration, it is assumed here that a query request for a target WS-Resource has been received in ServiceGroup 4, and it is also assumed that the target WS-Resource to be queried is registered in ServiceGroup 1.

As shown in block 601, ServiceGroup 4 receives a query request for all the WS-Resources with some query parameters, such as "property p1=A, and property p2=B".

For example, consider A=Asia-China-Beijing, and B=True.

Next, as shown in block 602, ServiceGroup 4 independently checks local index tables for properties p1 and p2.

Then, as shown in block 603, the results of two local index tables obtained in the previous processing step are merged, and unified paths will be found from two source lists thereof. That is, if there are property entities in the two index tables, and there are the same ServiceGroup references in the two source lists, then ServiceGroup 4 forwards the query request to such ServiceGroups.

Specifically, if there are remote ServiceGroup references in the resultant reference tables, then as shown in block 604, the local ServiceGroup, i.e. ServiceGroup 4 relays the above query request to the remote ServiceGroups; if there is local references in the resultant reference tables, then as shown in block 605, ServiceGroup 4 retrieves related information of the local ServiceGroup members.

Because it is assumed in the present embodiment that the target WS-Resource exists in ServiceGroup 1, the resultant reference tables from the operation as shown in block 603 only contain the remote ServiceGroup references, i.e., the references to ServiceGroups 2 and 3. Therefore, as shown in block 604, ServiceGroup 4 relays (forwards) the above query request to ServiceGroups 2 and 3.

After receiving the above query request from ServiceGroup 4, as shown in blocks 606 and 607, ServiceGroups 3 and 2 execute the processing operations similar to those as shown in blocks 602-605. That is, ServiceGroups 3 and 2 check the index tables for properties p1 and p2, merge the checking results and find out unified paths from the two source lists. Moreover, because it is assumed above that the target WS-Resource is registered in ServiceGroup 1, the resultant reference tables contain the remote ServiceGroups 1 and 2, respectively. Therefore, ServiceGroups 3 and 2 will forward the above query request to ServiceGroups 1 and 2, respectively.

After the processing operations described above, ServiceGroup 2 receives sequentially (or simultaneously) duplicated query requests of the same requestor from ServiceGroups 4 and 3. That is, as shown in block 609, ServiceGroup 2 will find that two duplicated query requests have been received from the different paths (i.e., from ServiceGroups 4 and 3, respectively). Then, ServiceGroup 2 will ignore the newer one, for example, ignore (or reject) the query request from ServiceGroup 3.

After receiving the above query request from ServiceGroup 2, as shown in block 608, ServiceGroup 1 with the target WS-Resource registered thereto returns endpoint references and related resource properties to ServiceGroup 2 in response to the above query request.

It should be explained here that, the operations as shown in blocks 608 and 609 may be executed simultaneously; however, it is also possible that they are executed in sequence, and either operation may be executed firstly depending on the practical requirements.

After receiving the response from ServiceGroup 1, as shown in block 610, ServiceGroup 2 relays this response to ServiceGroup 4.

After receiving said response from ServiceGroup 2, as shown in block 611, ServiceGroup 4 performs necessary processing operations on the response, and sends the processed result as a final query result to the requester making the above query request, thereby completing the process of querying the WS-Resources.

Although the process of performing a property-based query of the distributed WS-Resources in ServiceGroup 4 has been described above in the exemplary environment as shown in FIG. 5, those skilled in the art should appreciate that, depending the different number of the connected ServiceGroups and the different connection relationship between these ServiceGroups, the steps of the above query process described above may also be different.

For instance, because it is assumed in the embodiment described above that the target WS-Resource is registered in ServiceGroup 1, ServiceGroup 4 only receives the response to the query request from ServiceGroup 1 via ServiceGroup 2. However, in practice, the target WS-Resource may also be registered in more than one ServiceGroups, so ServiceGroup 4 will receive the responses to the query request from the different paths. Therefore, it is needed to merge the query results from the different paths and send the merged query result to the requester in the operation as shown in block 611.

Utilizing four ServiceGroups as an example, the process of how to create and/or update the WS-Resource property index tables among multiple ServiceGroups and the process of how to execute the property-based WS-Resource query have been described above in connection with the flowcharts in FIGS. 4 and 6. However, it is obvious for those skilled in the art that, depending on the specific implementations, for example, depending on the different number of ServiceGroups and the different connection relationships among the ServiceGroups, the processing flows as shown in FIGS. 4 and 6 can also have variants in other forms.

For example, in the case where there are more than four ServiceGroups, e.g., in the case where there is also a ServiceGroup 5 having directly bidirectional connections with ServiceGroups 3 or 4 and having subscribed to the meta topics thereof besides the above four ServiceGroups 1-4, in the process of creating the WS-Resource property index tables, ServiceGroup 3 or 4 notifies ServiceGroup 5 of the topics and values regarding the properties p1 and p2 in a manner similar to ServiceGroup 2, and ServiceGroup 5 can create the index tables for the properties p1 and p2 in a manner similar to ServiceGroup 3 or 4. That is, among the multiple WS ServiceGroups, the ServiceGroup having received the topics and values regarding the properties p1 and p2 creates the index tables for said properties, and notifies the ServiceGroups which have subscribed to the meta topics thereof, of the topics and values regarding the above properties p1 and p2, until the index tables for the properties p1 and p2 have been created in all the connected ServiceGroups.

In addition, for example, if it is assumed that, besides the four ServiceGroups 1-4 described above, there are still one or more ServiceGroups, e.g., a ServiceGroup 5, connected between the ServiceGroups 1 and 2, and there is an indexing direction from the ServiceGroup 2 to the ServiceGroup 1 via the ServiceGroup 5, then when executing the above query from the ServiceGroup 4, the ServiceGroup 2 will forward the query request to the ServiceGroup 1 with the target WS-Resource registered thereto via the above one or more ServiceGroups (e.g., the ServiceGroup 5).

Besides the examples illustrated above, there exist various more complicated situations in reality. However, it is obvious that these situations cannot be exhaustedly illustrated in this specification. Therefore, only the principles of the present disclosure have been described in the present specification. Those skilled in the art can make amendments to the processing flows described above in connection with FIGS. 4 and 6 based on the above description of the principles of the present disclosure, depending on the specific situations.

According to the method of the present disclosure discussed above, by employing the WS-Notification specifications, property index tables of distributed WS-Resources can be created among multiple loosely coupled WS Service-Groups, and multiple indexes can be utilized for the same service resource depending on the practical requirements to implement the multi-dimensional indexes of the resources, so that the WS-Resources can be better shared among the multiple ServiceGroups.

Moreover, when a certain resource property in a certain ServiceGroup has changed, the ServiceGroup can notify all the ServiceGroups, which are directly connected thereto and has subscribed to the meta topic thereof, of the change of the property, so that the property index tables of the service resource can be updated in the multiple connected WS ServiceGroups in real time.

In addition, using the method of the present disclosure discussed above, a complex query of the WS-Resource properties of the multiple target WS-Resources that reside on the different ServiceGroups can be performed based on composite query conditions in response to a query request from a client without complex operations performed by the client, thereby greatly simplifying the process of a query operation.

Furthermore, it should be noted that, the specific embodiments described above are only used to illustrate the present disclosure, and some specific details thereof are given only for the purpose of understanding the present disclosure and are not intended to make limitations to the present disclosure.

Moreover, although the process of how to create and/or update WS-Resource property index tables among multiple ServiceGroups and the process of how to execute a property-based WS-Resource query have been described above in connection with the flowcharts of the methods, however, those skilled in the art should understand that the processing flows discussed above can also be implemented using modularized hardware structures.

In another embodiment of the present disclosure, a system for creating WS-Resource property indexes among WS ServiceGroups which include at least a first ServiceGroup and one or more second ServiceGroups is also provided.

The system for creating WS-Resource property indexes comprises: means for creating, in the second ServiceGroup(s), indexes for properties of WS-Resources in the first ServiceGroup, which further comprising: means for publishing, from the first ServiceGroup, topics for the properties of the WS-Resources to be used as indexes; means for notifying one or more second ServiceGroups, which have subscribed the meta topic of the first ServiceGroup, of subtopics for said properties from the first ServiceGroup; means for creating index entities for said properties in said second ServiceGroup(s); means for notifying said second ServiceGroup(s) of values of said properties from the first ServiceGroup; and means for processing the index entities for said properties in said second ServiceGroup(s) according to the values of said properties.

In the system described above, if the topics and index entities for said properties exist in said second ServiceGroup(s), then the means for creating index entities for said properties in said second ServiceGroup(s) will ignore a notification about the subtopics for said properties from the first ServiceGroup.

Furthermore, in the system described above, if the values of said properties are not within the range of any existing index entity of said properties, then the means for processing the index entities for said properties according to the values of said properties will create new index entities for said values; if the values of said properties equal to old values as keys of the index entities for said properties, then the means for processing the index entities for said properties according to the values of said properties will merge said values with the index entities; and if the values of said properties are within the ranges of some index entities for said properties, then the means for processing the index entities for said properties according to the values of said properties will split said index entities.

Moreover, in a further preferred embodiment, this system further comprises means for creating indexes for said properties in third ServiceGroups, which further comprises: means for publishing topics for said properties from the second ServiceGroup(s); means for notifying one or more third ServiceGroups, which have subscribed the meta topic of the second ServiceGroup(s), of the topics and values regarding said properties from the second ServiceGroup(s); and means for creating and processing index entities for said properties in the third ServiceGroup(s).

The system described above can further comprise means for performing the following operations: creating indexes for said properties in one or more fourth ServiceGroups, which have subscribed to the third ServiceGroup the meta topic thereof, in a manner similar to the third ServiceGroup(s), and repeating the above steps until the index entities for said properties have been created in all the connected WS ServiceGroups.

In addition, the system described above can further comprise means for merging the index entities for said properties from the different paths, when the ServiceGroup(s) receiving the topics and values regarding said properties has received the topics and values regarding said properties from different paths.

In the system described above, when the WS-Resources in the first ServiceGroup have changed, notifying all the connected WS ServiceGroups of the changes from the first ServiceGroup to update the index entities for the properties created in all the connected WS ServiceGroups.

The system described above can further comprise means for creating, in the first ServiceGroup, indexes of the WS-Resources in the second ServiceGroup(s) when the first ServiceGroup is bidirectionally connected with the second ServiceGroup(s).

In any one of the systems describe above, for the same WS-Resource, the service resource properties to be used as indexes may be more than one property.

In a preferred embodiment, the service resource property to be used as an index is the location of the resource.

In any one of the systems described above, the means for creating the index entities can further comprise the index entities for said properties creating index tables for said properties, the index tables comprising all the index entities for said properties.

Besides providing the systems described above, in another preferred embodiment of the present disclosure, there is also provided a system for performing a property-based query of WS-Resources among multiple connected Web Service (WS) ServiceGroups, which include at least a first ServiceGroup, and in which property index tables of WS-Resources in remote ServiceGroups connected therewith have been created and are updated in real time.

The system for performing the query comprises: means for receiving, in the first ServiceGroup, a query request for a target WS-Resource with at least a certain resource property; means for checking a local index table for said property; means for forwarding said query request to said remote ServiceGroup if a remote ServiceGroup reference is found in the local index table; means for returning, by a target ServiceGroup to which the target WS-Resource is registered, a response to ServiceGroups from which said query request is received, after the target ServiceGroup receiving said query request, the response including an endpoint reference of the target WS-Resource and properties of the resource; and means for obtaining said response in the first ServiceGroup from ServiceGroups which have received said response.

The system for performing the query described above further comprises means for retrieving relevant information of local ServiceGroup members to obtain the endpoint reference of the target WS-Resource and properties of the resource, if a local reference is found in said local index table by the first ServiceGroup.

In addition, the system for performing the query described above can further comprise means for processing the endpoint reference of the target WS-Resource and the properties of the resource, which are obtained locally, and the endpoint reference of the target WS-Resource and the properties of the resource, which are obtained from other ServiceGroups, to obtain a final query result.

In the system for performing the query described above, said means for obtaining said response in the first ServiceGroup from the ServiceGroups which have received said response obtains said response from the ServiceGroups having received said response via intermediate ServiceGroups connected between them.

The system for performing the query described above can further comprise means for merging the found local index tables, if more than one local index tables for said property are found in the ServiceGroup.

The system for performing the query described above can further comprise means for rejecting the later query request, if said remote ServiceGroup obtain said query requests which are duplicated from different paths.

In any one of the systems for performing the query described above, said query request is a query request for WS-Resources with two or more resource properties.

In a preferred embodiment, said service resource property is the location of the resource.

For the sake of conciseness of the present disclosure, the structural block diagrams of the above mentioned systems according to the present disclosure have not been shown in the present specification, and only the simple text illustration is given above. Nevertheless, after reading the simple text illustration of the above system for creating indexes and the above system for executing a query, those skilled in the art can easily depict the structural block diagrams of these systems without creative works.

In addition, each of the operation steps of the above mentioned methods can also be implemented in a computer executable program which is stored in various machine readable storage media.

Moreover, the objects of the present disclosure can be achieved by providing directly or indirectly to a system or device storage media having codes of the above executable program stored thereon, then reading out the program codes and performing the same by a computer or CPU of the system or device.

At this time, so long as the system or device has the function of executing the program, the implementing mode thereof is not limited to the program, and the program can be in any form, for example, an object program, a program performed by an interpreter, or script data provided to an operating system, etc.

The machine readable storage media mentioned above may include but not be limited to various memories and storage units, semiconductor devices, magnetic disk units such as optical, magnetic and magneto-optic disks, and other media suitable for storing information.

In addition, the present disclosure may be achieved by a client computer by connecting to corresponding websites on the Internet, downloading the computer program codes of the present disclosure and installing the same into the computer and then executing the program.

One advantage of the present disclosure is in that, by using the indexing method according to the present disclosure, resource property-based index tables of WS-Resources can be created among multiple loosely coupled WS Service-Groups, and multi-dimensional indexing of the same service resource can be achieved if necessary.

Another advantage of the present disclosure is in that, by using the indexing method according to the present disclosure, when a certain resource property in a certain WS ServiceGroup has changed, the ServiceGroup will notify all the WS ServiceGroups connected therewith of said change, thereby updating index tables of the service resource in real time.

Still another advantage of the present disclosure is in that, by using the querying method according to the present disclosure, it can be quickly performed to query WS-Resource properties of multiple target WS-Resources that reside on different ServiceGroups without querying all WS Service-Group Instances as in the prior art.

Yet still another advantage of the present disclosure is in that, by using the present disclosure, target WS-Resources can be queried based on combined query conditions without performing complex operations on the client, thereby greatly simplifying the processing of the query operation and improving the query processing speed.

It should also be noted that, in this document, relational terms such as left and right, first and second, and the like may be used solely to distinguish one entity or action from another entity or action without necessarily requiring or implying any actual such relationship or order between such entities or actions. Moreover, the terms "comprises", "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
publishing with a client computer, from a first Web Service ServiceGroup, at least one topic, said first Web Service ServiceGroup having a Web Service Resource being defined by one or more properties associated with the at least one topic and being a member of group of a plurality of Web Service ServiceGroups, wherein the plurality of Web Service ServiceGroups are connected to each other by subscriptions to topics of individual Web Service ServiceGroups of the group;
notifying, with the client computer, a second Web Service ServiceGroup of one or more values of said one or more properties, said second Web Service ServiceGroup having subscribed to said at least one topic published by said first Web Service ServiceGroup, said second Web Service ServiceGroup being a member of the group and connected to said first Web Service ServiceGroup;
creating, with the client computer, one or more index entities for each of the one or more properties such that each of the one or more index entities is associated with a corresponding property and stores for that property a property value and an indication of an instance of a connected Web Service ServiceGroup that is a source of the property value;
notifying, with the client computer, the second Web Service ServiceGroup of a change to the property value in at least one of the one or more index entities; and
propagating the change to the property value to connected Web Service ServiceGroups of the group via a chain of subscriptions extending from the first Web Service ServiceGroup through successively connected Web Service ServiceGroups of the group.

2. The method of claim 1, wherein creating said one or more index entities for said one or more properties in said second Web Service ServiceGroup further comprises:
ignoring a notification about said one or more values of said one or more properties from said first Web Service ServiceGroup, if said one or more index entities for each of said one or more properties already exist in said second Web Service ServiceGroup.

3. The method of claim 1, further comprising:
processing said index entities for said one or more properties according to said values of said one or more properties, wherein said processing comprises:
creating new index entities for said values in said second Web Service ServiceGroup if said values are not within a range of at least one of said index entities.

4. The method of claim 1, further comprising:
processing said index entities for said one or more properties according to said values of said one or more properties, wherein said processing comprises:
merging said values with said index entities in said second Web Service ServiceGroup if said values are equal to at least one of said index entities.

5. The method of claim 1, further comprising:
processing said index entities for said one or more properties according to said values of said one or more properties, wherein said processing comprises:
splitting said index entities in said second Web Service ServiceGroup if said values are within a range of at least one of said index entities.

6. The method of claim 1, further comprising:
publishing at least one topic for said one or more properties from said second Web Service ServiceGroup;
notifying a third Web Service ServiceGroup, which has subscribed to said at least one topic published by said second Web Service ServiceGroup, of said at least one topic and values relating to said one or more properties from said second Web Service ServiceGroup; and
creating and processing index entities for said one or more properties in said third Web Service ServiceGroup.

7. The method of claim 6, further comprising:
creating indexes for said one or more properties in a fourth Web Service ServiceGroup, which has subscribed to at least one topic published by said third Web Service ServiceGroup, and until said index entities for said one or more properties have been created in all connected Web Service ServiceGroups.

8. The method of claim 7, further comprising:
merging said index entities for said one or more properties if a Web Service ServiceGroup has received topics and values of said one or more properties from different paths.

9. The method of claim 7, further comprising:
notifying said connected Web Service ServiceGroups of changes from said first Web Service ServiceGroup to update said index entities for said one or more properties created in all said connected Web Service ServiceGroups if said values of said one or more properties of said Web Service Resource in said first Web Service ServiceGroup have changed.

10. The method of claim 1, further comprising:
creating, in said first Web Service ServiceGroup, indexes of said Web Service Resources in said second Web Service ServiceGroup if said first Web Service ServiceGroup is bidirectionally connected with said second Web Service ServiceGroup.

11. The method of claim 1, wherein said one or more properties include a location of a resource.

12. The method of claim 1, wherein creating said index entities for said one or more properties further comprises creating an index table, said index table comprising said index entities for said one or more properties.

13. A system comprising:
at least one processor comprising:
a publishing module configured to publish, from a first Web Service ServiceGroup, at least one topic relating to one or more properties of a Web Service Resource associated with the at least one topic and said first Web Service ServiceGroup, wherein said first Web Service ServiceGroup is a member of a group of a plurality of Web Service ServiceGroups, and wherein the plurality of Web Service ServiceGroups are connected to each other by subscriptions to topics of individual Web Service ServiceGroups of the group;
a first notification module that notifies a second Web Service ServiceGroup of one or more values of said one or more properties, said second Web Service ServiceGroup having subscribed to said at least one topic published by said first Web Service ServiceGroup, said second Web Service ServiceGroup being a member of the group and connected to said first Web Service ServiceGroup;
a creation module that creates one or more index entities for each of the one or more properties such that each of the one or more index entities is associated with a corresponding property and stores for that property a property value and an indication of an instance of a connected Web Service ServiceGroup that is a source of the property value;
a second notification module that notifies the second Web Service ServiceGroup of a change to the property value in at least one of the one or index entities; and
one or more third notification modules to propagate the change to the property value to connected Web Service ServiceGroups of the group via a chain of subscriptions extending from the first Web Service ServiceGroup through successively connected Web Service ServiceGroups of the group.

14. The system of claim 13, wherein said creation module ignores a notification about said one or more values of said one or more properties from said first Web Service ServiceGroup if said one or more topics and index entities for each of said one or more properties already exist in said second Web Service ServiceGroup.

15. The system of claim 13, wherein said at least one processor further comprises:
a processing module to create new index entities for said values if said values of said one or more properties are not within a range specified by at least one of said index entities.

16. The system of claim 13, wherein said at least one processor further comprises:
a processing module to merge said values with said index entities if said values of said one or more properties are equal to a value of at least one of said index entities.

17. The system of claim 13, wherein said at least one processor further comprises:
a processing module to split said index entities if said values of said one or more properties are within a range specified by at least one of said index entities.

18. The system of claim 13, wherein said index entities are merged if a Web Service ServiceGroup received said topics and values of said one or more properties from different paths.

19. The system of claim 13, wherein each of said connected Web Service ServiceGroups are notified to update said index entities for said one or more properties if said Web Service Resource in said first Web Service ServiceGroup has changed.

20. The system of claim 13, wherein indexes of said Web Service Resources in said second Web Service ServiceGroup are created in said first Web Service ServiceGroup if said first Web Service ServiceGroup is bidirectionally connected with said second Web Service ServiceGroup.

21. The system of claim 13, wherein said one or more properties include a location of a resource.

22. The system of claim 13, wherein said creation module creates an index table, said index tables comprising all said index entities for said one or more properties.

23. A computer program product comprising a computer readable hardware storage medium having a computer readable program, wherein the computer readable program when executed on a computer causes the computer to:
publish, from a first Web Service ServiceGroup, at least one topic, said first Web Service ServiceGroup having a Web Service Resource being defined by one or more properties associated with the at least one topic and being a member of a group of a plurality of Web Service ServiceGroups, wherein the plurality of Web Service ServiceGroups are connected to each other by subscriptions to topics of individual Web Service ServiceGroups of the group;

notify a second Web Service ServiceGroup of one or more values of said one or more properties, said second Web Service ServiceGroup having subscribed to said at least one topic published by said first Web Service ServiceGroup, said second Web Service ServiceGroup being a member of the group and connected to said first Web Service ServiceGroup;

create one or more index entities for each of the one or more properties such that each of the one or more index entities is associated with a corresponding property and stores for that property a property value and an indication of an instance of a connected Web Service ServiceGroup that is a source of the property value;

notify the second Web Service ServiceGroup of a change to the property value in at least one of the one or more index entities; and propagate the change to the property value to connected Web Service ServiceGroups of the group via a chain of subscriptions extending from the first Web Service ServiceGroup through successively connected Web Service ServiceGroups of the group.

24. The computer program product of claim 23, wherein the computer readable program when executed on a computer further causes the computer to ignore a notification about one or more values of said one or more properties from said first Web Service ServiceGroup, if said one or more topics and index entities for each of said one or more properties already exist in said second Web Service ServiceGroup.

25. The computer program product of claim 23, wherein each index entity indicates a range of the value of the corresponding property.

26. The computer program product of claim 25, wherein new index entities are created for said values in said second Web Service ServiceGroup if said values are not within the range of an existing index entity.

27. The computer program product of claim 23, wherein said values of said one or more properties are merged with said index entities in said second Web Service ServiceGroup if said values of said one or more properties are equal to old values as keys of said index entities for said one or more properties.

28. The computer program product of claim 25, wherein said index entities are split in said second Web Service ServiceGroup if said values are within said range of one or more index entities.

29. The computer program product of claim 23, wherein the computer readable program when executed on a computer further causes the computer to:
publish at least one topic for said one or more properties from said second Web Service ServiceGroup;
notify a third Web Service ServiceGroup, which has subscribed to said at least one topic published by said second Web Service ServiceGroup, of said at least one topic and values of said one or more properties from said second Web Service ServiceGroup; and
create and process index entities for said one or more properties in said third Web Service ServiceGroup.

30. The computer program product of claim 29, wherein the computer readable program when executed on a computer further causes the computer to:
create indexes for said one or more properties in a fourth Web Service ServiceGroup, which has subscribed to at least one topic published by said third Web Service ServiceGroup, until said index entities for said one or more properties have been created in all connected Web Service ServiceGroups.

31. The computer program product of claim 23, wherein the computer readable program when executed on a computer further causes the computer to:
merge said index entities for said one or more properties if a Web Service ServiceGroup has received said topics and values of said one or more properties from different paths.

32. The computer program product of claim 23, wherein the computer readable program when executed on a computer further causes the computer to:
notify all said connected Web Service ServiceGroups to update said index entities for said one or more properties created in all said connected Web Service ServiceGroups if said values of said one or more properties of said Web Service Resource in said first Web Service ServiceGroup have changed.

33. The computer program product of claim 23, wherein the computer readable program when executed on a computer further causes the computer to create, in said first Web Service ServiceGroup, indexes of said Web Service Resources in said second Web Service ServiceGroup if said first Web Service ServiceGroup is bidirectionally connected with said second Web Service ServiceGroup.

34. The computer program product of claim 23, wherein said one or more properties include a location of a resource.

35. The computer program product of claim 23, wherein said creating said index entities for said one or more properties further comprises creating an index table, said index table comprising said index entities for said one or more properties.

* * * * *